Dec. 22, 1964    W. D. HUSTON    3,162,375
INSTRUMENT ILLUMINATING MEANS
Filed Jan. 17, 1962
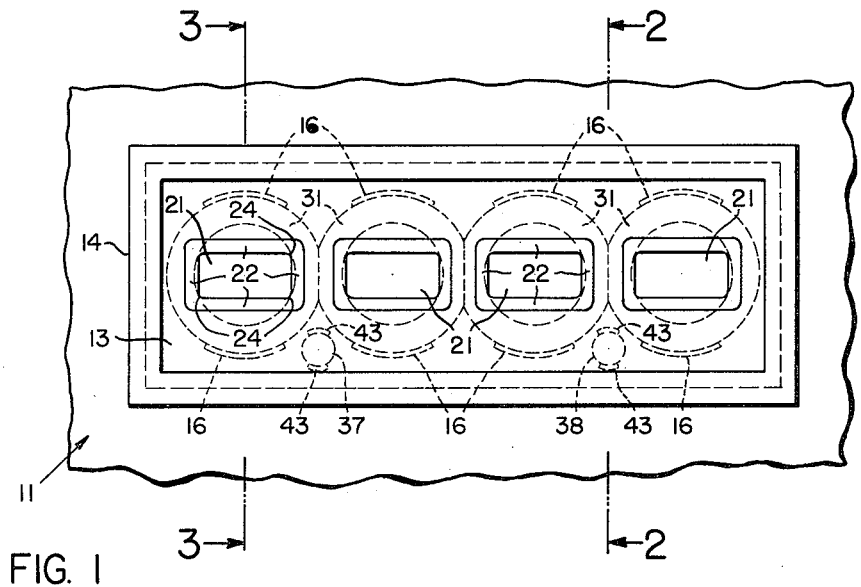
FIG. 1
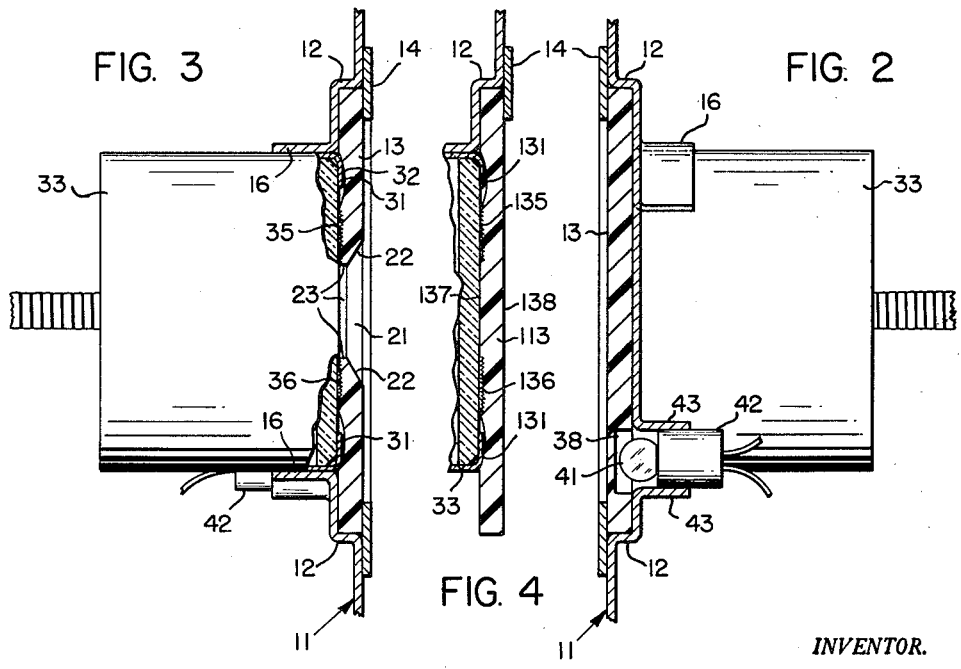
FIG. 3    FIG. 2
FIG. 4
INVENTOR.
WILLIAM D. HUSTON
BY
Attorney

United States Patent Office 3,162,375
Patented Dec. 22, 1964

3,162,375
INSTRUMENT ILLUMINATING MEANS
William D. Huston, Monroe County, N.Y., assignor to American Radiator & Standard Sanitary Corporation, New York, N.Y., a corporation of Delaware
Filed Jan. 17, 1962, Ser. No. 166,862
5 Claims. (Cl. 240—8.16)

This invention relates to gauges such as are used on the dashboards of automotive vehicles, and more particularly to a means for illuminating the faces of such instruments.

In automotive vehicles it is usual to provide a plurality of gauges to record or indicate operating conditions such as speed, mileage, coolant temperature, oil pressure, fuel level, etc. These gauges are normally mounted on the back of the vehicle dashboard or instrument panel and may be covered by a common glass so that the gauge faces can be seen by the operator of the vehicle.

Heretofore, the faces of the gauges have generally been illuminated by electric light bulbs interposed between the cover glass and the gauge gaces. One or more bulbs are positioned adjacent the marginal edge of a gauge face. Such arrangements, however, produce an uneven distribution of light across the faces of the gauges. That portion of the gauge face closest to a bulb tends to be particularly well illuminated thereby, while those portions remote from the bulb are not as well illuminated. Moreover, particularly in the case of gauges which employ moving indicator pointers or the like, such remote portions are often cast in the shadow of the moving pointer as it passes between the bulb and the remote portions of the gauge face. While it is theoretically possible to eliminate shadows and provide nearly uniform illustration by placing a plurality of bulbs around the outside of the gauge, such an arrangement would prove to be highly impractical because of its ultimate cost and size.

One object of the present invention is to provide a relatively simple and economic means for uniformly illuminating the face of an instrument or gauge mounted on the dashboard of an automotive vehicle or the like.

Another object of this invention is to provide relatively simple and economic means for illuminating uniformly a plurality of gauges on the dashboard of an automotive vehicle.

Another object of the invention is to provide a light transmitting member which may be used to cover the faces of a plurality of gauges and transmit light from a remote source to these faces to illuminate all of them uniformly.

Another object of the invention is to provide improved means of the character described for use in illumination of a plurality of gauges simultaneously which is usable with conventional gauges and will permit mounting them directly on the instrument board of an automotive vehicle or any other instrument board, and illuminating them all simultaneously and uniformly.

Other objects of the invention will be apparent hereinafter from the specification and from the recital of the appended claims, particularly when read in conjunction with the accompanying drawing.

In the drawing:

FIG. 1 is a fragmentary front elevation of the dashboard of an automotive vehicle and illustrating the manner in which a plastic mask may be used in accordance with one embodiment of this invention in front of a plurality of gauges to illuminate them all simultaneously;

FIG. 2 is a sectional view taken along the line 2—2 of FIG. 1 and looking in the direction of the arrows;

FIG. 3 is a sectional view taken along the line 3—3 of FIG. 1 and looking in the direction of the arrows; and FIG. 4 is a sectional view, similar to FIG. 3, but with part of a gauge casing cut away and showing a modified form of illuminating cover or mask employed in accordance with a further embodiment of this invention.

Referring now to the drawing by numerals of reference, the dashboard designated at 11 is recessed, as shown at 12, to accommodate an oblong plastic mask 13, which may be made of transparent "Plexiglas" or "Lucite," or similar light transmittable plastics. Mask 13 is secured in the recess 12 by a rectangular frame 14 which is secured to the front of dashboard 11.

As shown more clearly in FIG. 1, the rectangular mask 13 has therein a plurality of longitudinally spaced, oblong apertures 21. The apertures 21 are similar in shape and have walls 23 which at one face of the mask have inclined or chamfered marginal edges 22 the corners of which are rounded as at 24.

Mounted behind the mask 13 in registery with each of the apertures 21 is a conventional gauge. One of these gauges may be a liquid level gauge for indicating the level of liquid in the fuel tank; another may be for indicating oil pressure, a third for indicating temperature in the coolant system for the engine, etc. The gauges, whose housings are denoted at 33, are supported in registry with the respective apertures 21 by arcuate flanges 16 which are integral with and which extend rearwardly from the dashboard 11. In its rear face the plastic mask 13 is provided with four shallow, circular grooves 31. These are a dapted to receive the bezels 32 which secure the cover glasses in the gauge housings 33.

The portions 35 and 36 of the rear face of mask 13, which lie intermediate a respective aperture 21 and the surrounding circular groove 31 have a plurality of fine, closely spaced parallel grooves that define saw-tooth shaped projections (FIG. 3) that extend parallel to the longitudinal edges of apertures 21. Portions 35 and 36 confront faces of the gauges mounted in the dashboard. The back of mask 13 further includes two, spaced, circular recesses 37 and 38 each of which is adapted to accommodate the forward end of an electric light bulb 41 (FIG. 2) carried by a bulb housing 42. In the embodiment illustrated in FIGS. 1 to 3, the recesses 37 and 38 are positioned adjacent one of the longitudinal edges of mask 13, each approximately midway two of the apertures 21; the recess 37 being approximately midway the outermost aperture 21 at the left, as viewed in FIG. 1, and the next adjacent aperture 21; and the other recess 38 being approximately midway the outermost aperture 21 at the right, and the next adjacent aperture 21. The diameters of the recesses 37 and 38 are small enough so that neither recess 37 nor 38 intersects any of the grooves 31. Each of the housings 42 for bulbs 41 is removably secured between two spaced arcuate flanges 43 which are integral with and which extend rearwardly from the rear face of dashboard 11.

Before assembly of the mask 13 into the dashboard, its front face, its four outer, marginal edges, and its back except for the walls of the bulb recesses 37 and 38 and the striated surfaces 35 and 36, may be painted white. The front, marginal edges, and back may, however, be overpainted with another color, if desired, to satisfy the wishes of the customer. Hence, when the painted mask and the gauges are assembled as shown in FIG. 1, and the bulbs 41 are illuminated, the light from the bulbs radiates outwardly through the walls of the respective recesses 37 and 38 to the interior of the mask 13. Because most of the outer surface of mask 13 is painted white, little or no light is transmitted completely through mask 13. Instead, most of the light is reflected back alternately by the white painted surfaces at the front and back of the mask and forward on the faces of the gauges 33, illuminating them. The fine, closely-spaced saw-tooth ribs in the surfaces 35 and 36 serve to refract and diffuse the reflected light inwardly toward the centers of openings 21 and across the faces of the gauges 33 so that no undue concentration of light will occur at any one spot on a respective gauge face. Although some light will be transmitted through the surfaces 22 and 23 defining apertures 21, to thereby illuminate the outline of a respective aperture, it may be desirable in certain cases to paint the inclined surfaces 22 white so as to increase the amount of light reflected onto the light transmitting surfaces 35 and 36.

In the case of vehicles used on farms (tractors) or construction projects (bulldozers), the dashboards or instrument panels are constantly exposed to the elements (wind, rain, dust, etc.). Since large quantities of dust will tend to build up in the apertures 21 of the mask shown in FIGS. 1 to 3, it is preferable in the case of such vehicles to use a transparent, plastic mask of the type shown at 113 in FIG. 4. In this embodiment the apertures 21 are eliminated; and the mask 113 completely covers the front of each gauge 33. As in the case of the mask 13, the inner face of mask 113 has four annular recesses 131 (only one of which is shown in FIG. 4) to accommodate the marginal edges of the gauge faces; and it has vertically-spaced striated surfaces 135 and 136 adapted to confront the face of each gauge for directing light thereon. Mask 113 also has recesses (not shown) in its rear face to accommodate illuminating bulbs in the same manner as mask 13.

Similarly to mask 13, the exterior of mask 113 is coated with white paint, except for the walls of the bulb recesses, the vertically spaced striated areas 135 and 136, and the aligned areas 137 and 138 at the front and back of mask which confront the faces of the gauges, to prevent the transmission of light therethrough. The aligned areas 137 and 138 constitute transparent areas through which the respective gauge faces may be viewed from the front of the dashboard. Since the areas on the face of mask 113 directly opposite the striated areas 135 and 136 are painted white, the former will cause light from the illuminating bulbs (not shown in FIG. 4) to be reflected onto the unpainted surfaces 135 and 136, and therethrough to the faces of the gauges.

From the foregoing it will be apparent that applicant has devised a very simple and economic means of transmitting and diffusing light to and across the faces of a plurality of dashboard gauges. Applicant's mask further provides a ready means for controlling the illumination afforded by only two light bulbs in such manner that these bulbs readily illuminate more than two gauge faces each, while at the same time eliminating any undesirable shadows or glare on the gauge faces. Moreover, while applicant has illustrated a rectangular mask having four rectangular apertures in combination with two illuminating bulbs, such specific shapes and quantities are merely exemplary and could obviously be altered to accommodate variations in the shape of a respective dashboard or gauge housing. In addition, while the striated surfaces (35, 36 and 135, 136) have been illustrated at only two sides of a respective aperture 21 or transparent area 137, it is to be understood that striated areas may also be provided at the remaining two sides in the areas lying intermediate an opening 21, e.g., and the recess 31 disposed thereabout. Also, the means by which the mask, gauges and bulbs are mounted in the dashboard could be altered without changing the scope of this invention. For instance, it is intended that flanges 16 and 43 be merely exemplary of the type and quantity of means which could be employed for mounting gauges 33 and light bulbs 41, respectively, on the dashboard. Furthermore, while the invention has been described in connection with the illumination of gauges mounted on the dashboard of an automotive vehicle, it will be understood that it may be used wherever a plurality of gauges are mounted close to one another, and it is desired to illuminate their faces economically simultaneously.

While the invention has been described in connection with a specific embodiment thereof, then it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention what I claim is:

1. In combination with a support having a plurality of gauges and light bulbs mounted in spaced relation thereon,
   (a) a sheet of plastic material capable of transmitting light,
   (b) said sheet having a plurality of spaced apertures therein and a like plurality of first recesses in the back thereof, each of said recesses being spaced from and surrounding the edge of a respective aperture at the back of said sheet,
   (c) said sheet having a plurality of second recesses in the back thereof adjacent said first recesses,
   (d) means securing said sheet to the support,
   (e) means mounting a plurality of gauges on said support behind said sheet with their front indicating faces confronting the rear face of said sheet and in registry with said apertures and with each of said first recesses receiving the marginal edge of the front indicating face of a respective gauge and forming a seat therefor,
   (f) each of said apertures being smaller in area than the front indicating face of the gauge mounted behind the aperture,
   (g) means for mounting a light bulb on said support behind each of said second recesses with its front end in registry with a second recess,
   (h) said plastic sheet including refracting means on the portions of said sheet confronting the indicating faces of said gauges in the areas defined by the marginal edges of said apertures and the surrounding first recesses, and operative upon the lighting of said bulbs to cause light therefrom to be transmitted through said portions to illuminate said gauge faces, and
   (i) further means on the front, marginal edges, and back of said sheet reflecting back the light from the bulbs and onto said refracting means, whereby the light from the bulbs will be transmitted through said sheet to illuminate the front faces of the gauges.

2. The combination as claimed in claim 1 wherein said refracting means comprises a plurality of saw-tooth shaped projections formed on the surfaces of said portions of the sheet back which confront the respective gauge faces, said projections also serving to provide an even distribution of the light transmitted therethrough.

3. The combination as claimed in claim 1 wherein the marginal edges of said apertures are chamfered at the face of said sheet, the chamfered surfaces being operative to transmit light to outline the apertures in said dashboard.

4. A device for transmitting illumination from light bulbs to the faces of gauges mounted adjacent said bulbs, comprising
   (a) a sheet of plastic material capable of transmitting light and having at least one aperture therethrough,
   (b) said sheet having a first recess in the rear face thereof surrounding said aperture, the portion of the rear face of the sheet between said first recess and said aperture having a plurality of closely spaced V-shaped grooves in its surface,
   (c) said sheet having a second recess therein and being mounted with said aperture and said grooved surface confronting the front indicating face of at least one gauge, and with said first recess disposed over and engaging the front marginal edge of said gauge, and with said second recess disposed over the forward end of a light bulb, said sheet being operative to transmit light from said bulb through said grooved surface to said gauge face,
(d) said sheet having means thereon operative to prevent transmittal of light through its front face, marginal edges and remaining portion of its rear face, and
(e) the marginal edge of said aperture being chamfered at the front face of said sheet, the chamfered surface being operative to transmit light to outline the aperture in said sheet.

5. In combination,
(a) a support,
(b) a sheet of plastic, light-transmitting material having in the rear face thereof a plurality of first recesses each of which is adapted to surround and form a seat for the marginal edge of the front indicating end of a gauge,
(c) means securing on said support said sheet of light transmitting material,
(d) means mounting a plurality of gauges on said support behind said sheet with their front indicating faces confronting the rear face of said sheet and with the marginal edges thereof seated in said first recesses, said sheet having
(e) at least one further recess in its rear face outside the perimeters of the gauges, and said sheet, having
(f) two spaced groups of serrations on its rear face within the perimeter of each of said first recesses and confronting the front face of a respective gauge,
(g) means mounting a source of light behind said sheet with said source extending into said further recess, and
(h) means on the front, marginal edges, and back of said sheet, except opposite the front faces of said gauges, reflecting back the light from said source and onto said serrations, whereby the light from said source will be transmitted through said sheet by said serrations to illuminate the gauges.

References Cited by the Examiner
UNITED STATES PATENTS

| | | | |
|---|---|---|---|
| 2,562,498 | 7/51 | Leboffe | 240—8.16 |
| 2,566,026 | 8/51 | Hughes | 240—2.1 X |
| 2,695,354 | 11/54 | Neugass | 240—8.16 |
| 2,831,453 | 4/58 | Hardesty | 240—2.1 X |
| 2,858,417 | 10/51 | Stevens | 240—1 X |
| 2,874,268 | 2/59 | Martin | 240—2.1 X |

FOREIGN PATENTS

| | | |
|---|---|---|
| 895,017 | 3/44 | France. |
| 838,431 | 6/60 | Great Britain. |

NORTON ANSHER, *Primary Examiner.*